(12) United States Patent
Yamabayashi et al.

(10) Patent No.: US 12,140,433 B2
(45) Date of Patent: Nov. 12, 2024

(54) APPARATUS AND METHOD FOR ROUTE PLANNING

(71) Applicant: Furuno Electric Co., Ltd., Nishinomiya (JP)

(72) Inventors: Jun Yamabayashi, Sayama (JP); Takatoshi Morita, Nishinomiya (JP); Masato Okuda, Kyoto (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 221 days.

(21) Appl. No.: 17/875,416

(22) Filed: Jul. 28, 2022

(65) Prior Publication Data

US 2022/0364865 A1     Nov. 17, 2022

Related U.S. Application Data

(63) Continuation of application No. PCT/JP2021/000479, filed on Jan. 8, 2021.

(30) Foreign Application Priority Data

Feb. 12, 2020   (JP) ................................. 2020-021623

(51) Int. Cl.
*G01C 21/00* (2006.01)
*B63B 49/00* (2006.01)
(Continued)

(52) U.S. Cl.
CPC .............. *G01C 21/20* (2013.01); *B63B 49/00* (2013.01)

(58) Field of Classification Search
CPC ...... G01C 21/00; G01C 21/203; B63B 49/00; B63B 79/40; G08G 3/00; G01S 7/62
See application file for complete search history.

(56) References Cited

U.S. PATENT DOCUMENTS

2014/0309928 A1* 10/2014 Tognoni ............... G01C 21/203
701/425
2014/0309931 A1* 10/2014 Ohmori ............... G01C 21/203
701/466
(Continued)

FOREIGN PATENT DOCUMENTS

JP    2003-35557 A      2/2003
JP    2014-206452 A    10/2014
(Continued)

OTHER PUBLICATIONS

International Search Report and Written Opinion mailed on Mar. 9, 2021, received for PCT Application PCT/JP2021/000479, filed on Jan. 8, 2021, 8 pages including English Translation.

Primary Examiner — Tan Q Nguyen

(74) Attorney, Agent, or Firm — XSENSUS LLP

(57) ABSTRACT

A route planning apparatus is provided for planning a navigation route of a ship. The route planning apparatus includes a display to display a chart on a screen; and an operation interface configured to designate a position in the screen. In addition, the route planning apparatus includes a storage configured to store one or more potential base points that may be a potential base point of a waypoint; a processing circuitry configured to: set a waypoint on the chart in response to a navigator's operation; extract the base points within a predetermined range of the set waypoint as a reference from the storage; and a determine the extracted potential base point to be the base point of the set waypoint.

8 Claims, 6 Drawing Sheets

(51) Int. Cl.
*G01C 21/20* (2006.01)
*B63B 79/40* (2020.01)

(56) References Cited

U.S. PATENT DOCUMENTS

| | | | | |
|---|---|---|---|---|
| 2015/0330804 A1* | 11/2015 | Okuda | ............... | G09B 29/007 |
| | | | | 701/487 |
| 2017/0067984 A1* | 3/2017 | Nakahama | ............... | G01S 7/24 |
| 2021/0009240 A1* | 1/2021 | Nishiyama | ............. | B63B 79/10 |
| 2023/0123565 A1* | 4/2023 | Sekine | ................. | B63H 25/04 |
| | | | | 701/21 |

FOREIGN PATENT DOCUMENTS

| | | |
|---|---|---|
| JP | 2016-88234 A | 5/2016 |
| JP | 6076611 B2 | 2/2017 |

* cited by examiner

Potential Base Point Database (DB) 22

| ID 31 | Type 32 | Position 33 | Height 34 | Visible Distance 35 | ... |
|---|---|---|---|---|---|
| 01 | Lighthouse | xxx,yyy | hhh | ddd | ... |
| 02 | Lighthouse | xxx,yyy | hhh | ddd | ... |
| 03 | Buoy | xxx,yyy | hhh | ddd | ... |
| 04 | Buoy | xxx,yyy | hhh | ddd | ... |
| 05 | Cape | xxx,yyy | hhh | ddd | ... |

FIG.3

APPARATUS AND METHOD FOR ROUTE PLANNING

CROSS-REFERENCE TO RELATED APPLICATIONS

This application is a continuation of PCT International Application No. PCT/JP2021/000479, which was filed on Jan. 8, 2021, and which claims priority to Japanese patent Application No. 2020-021623 filed on Feb. 12, 2020, the entire disclosures of each of which are herein incorporated by reference for all purposes.

TECHNICAL FIELD

The present disclosure mainly relates to a route planning apparatus for planning a navigation route in water, a route planning method for planning the navigation in water, and a route planning program for executing a function for planning the navigation route in water.

BACKGROUND

Conventionally, route planning devices are equipped in movable bodies (such as, automobiles, ships, airplanes) to display a route to be navigated by a user. The user inputs a departure location and a destination location to get the desired route from the route planning device. For example, the route planning devices equipped in automobiles are stored with maps, and based on the maps, these devices display various kinds of routes according to the user requirement. Patent Document 1 discloses such a route planning device.

Patent Document 1 discloses a route planning apparatus comprising: a display module for displaying a route to be navigated planned by a user on a chart; a date/time input module for receiving input of a navigation date/time of the route; a caution information reading module for reading caution information affecting navigation and information associated with a position and a date/time based on the navigation date/time input; and a route verification module for extracting the caution information located at least on the route or near the route based on the position indicated by the caution information read by the caution information reading module and the position of the route, and verifying the route based on the extracted caution information. As used herein, the patent document 1 is JP6076611B2.

In a route planning, waypoints are established with base points in accordance with the waypoints. The base points may correspond to landmarks such as lighthouses, buoys, capes and the like. The base points are the landmarks that are easily identifiable by a navigator onboard. The navigator onboard picks up and selects such a base point and sets a waypoint on the basis of the base point.

In a case of route planning by ECDIS (Electronic Chart Display and Information System), there is a need to set up waypoints and base points along with distances and directions from waypoints to base points. In a conventional ECDIS, the navigator onboard manually finds and selects an appropriate base point. Next, the navigator onboard sets a waypoint while checking the distance and direction from the base point to the waypoint. These procedures are complicated.

The present disclosure is in view of the above problems. The objective of the present disclosure is to provide a route planning apparatus that enables to set a waypoint and the corresponding base point with ease.

SUMMARY

To solve the problem mentioned above, a route planning apparatus according to one embodiment of the present disclosure comprises: a display that is configured to display a chart on a screen; and an operation interface that is configured to designate a position on the screen. In addition, the route planning apparatus comprises: a storage configured to store one or more potential base points that can be a base point of a waypoint in association with their positions; and a processing circuitry configured to: set waypoints on the chart in response to a navigator's operation received by the operation interface; extract the base points located within a predetermined range with the set waypoint as a reference from the storage; and determine a selected base point to set the base point of the set waypoint.

According to another embodiment of the present disclosure, a route planning method is provided. The route planning method includes setting waypoints on a chart based on a navigator's operation. The route planning method includes extracting potential base points located within a range of reference to the set waypoints. The potential base points can be base points of corresponding waypoints. The route planning method includes determining an extracted base point to be the base point of the set waypoint.

According to another embodiment of the present disclosure, a computer program, when executed by one or more processors, cause a processing circuitry to perform a method that comprises: setting a waypoint on a chart, selecting potential base points of the waypoint within the range with the set waypoint as a reference from one or more potential base points associated with corresponding position of the set waypoint, and determining the set base point of the waypoint from the selected potential base points.

According to the present disclosure, waypoints for planning a navigation route and their potential base points can be set with ease.

BRIEF DESCRIPTION OF DRAWINGS

The present disclosure is illustrated by way of example and not by way of limitation in the figures of the accompanying drawings, in which the like reference numerals indicate like elements and in which:

FIG. 3 is a diagram showing an example of the contents of a database, in accordance with an embodiment of the present disclosure;

DETAILED DESCRIPTION

Embodiments of the present disclosure will be described below with reference to the drawings.

Figure 1:
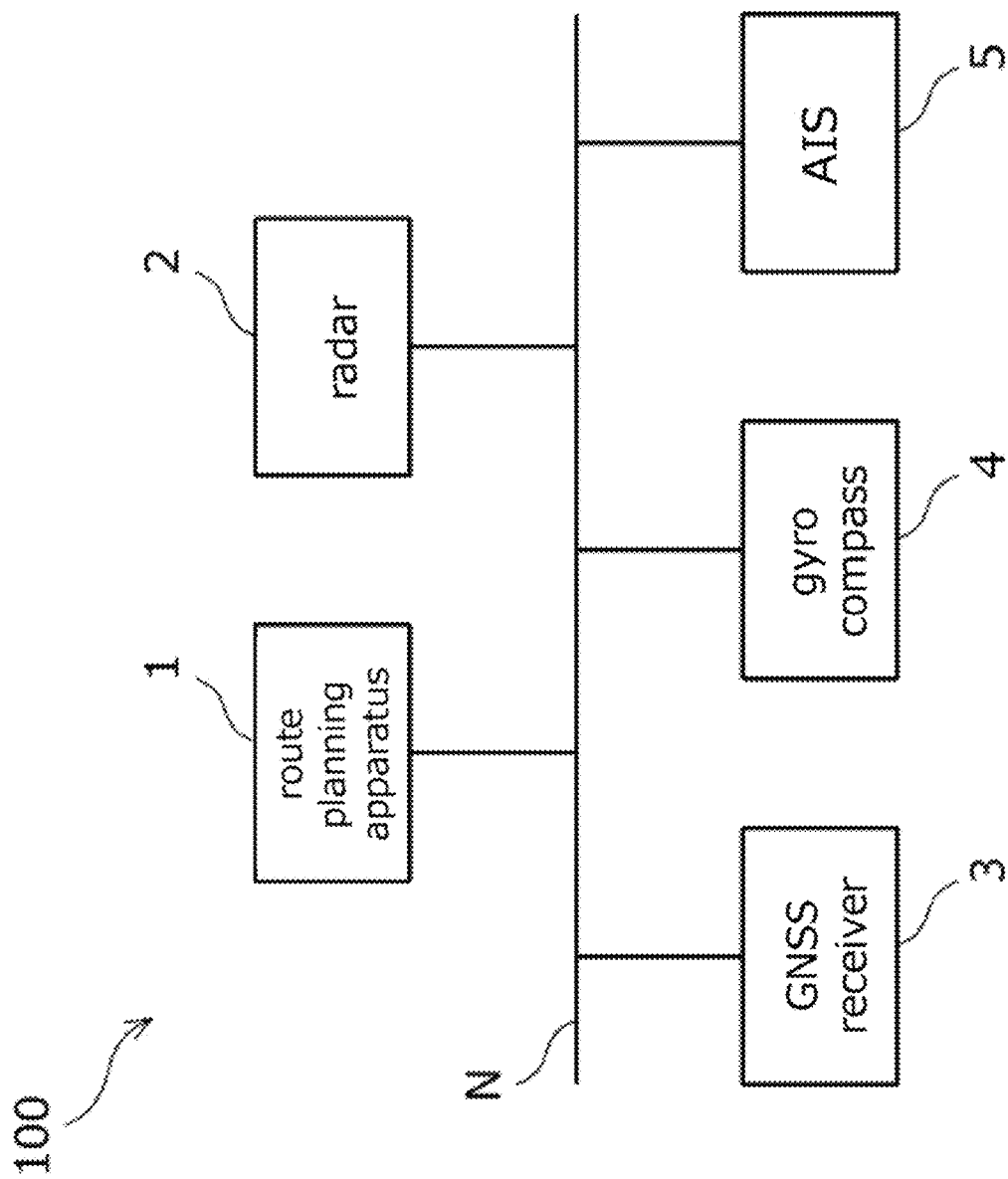
FIG. 1 is a diagram showing a configuration example of a ship ICT (Information and Communication Technology) system, in accordance with an embodiment of the present disclosure.

FIG. 1 is a block diagram showing a configuration example of a ship ICT system 100, in accordance with an embodiment of the present disclosure. The ship ICT system 100 includes a route planning apparatus 1, a radar 2, a GNSS (Global Navigation Satellite System) receiver 3, a gyrocompass 4, and an AIS 5. The components of the ship ICT system 100 are connected to a network N for communicating with each other. The network N includes but may not be limited to a LAN (Local Area Network).

The route planning apparatus 1 is an Electronic Chart Display and Information System (herein after ECDIS). The route planning apparatus 1 may be a GNSS plotter. A specific configuration example of the route planning apparatus 1 will be described later.

The route planning apparatus 1 is connected with the radar 2. The radar 2 is configured to detect a target existing around a corresponding or own ship (hereinafter, the ship) and generates target tracking data (TT data) representing a position and a velocity vector of the target.

Further, the GNSS receiver 3 is configured to detect the position of the ship based on radio waves received at the GNSS receiver 3. In addition, the GNSS receiver 3 is configured to generate position data representing the position of the ship.

The GNSS receiver 3 is connected with the gyrocompass 4. The gyrocompass 4 is configured to detect the heading of the ship and further is configured to generate bearing data showing the heading of the ship. Alternatively, a GPS (global positioning system) compass or a magnetic compass may be used to detect the heading of the ship.

The GNSS receiver 3 is connected to the AIS 5. The AIS 5 corresponds to Automatic Identification System that transmits AIS data to surrounding ships and land control centers. Also, the AIS 5 is configured to receive AIS data from surrounding ships and land control centers. In addition, a VDES (VHF Data Exchange System) may be used in the ship ICT system 100.

Figure 2:
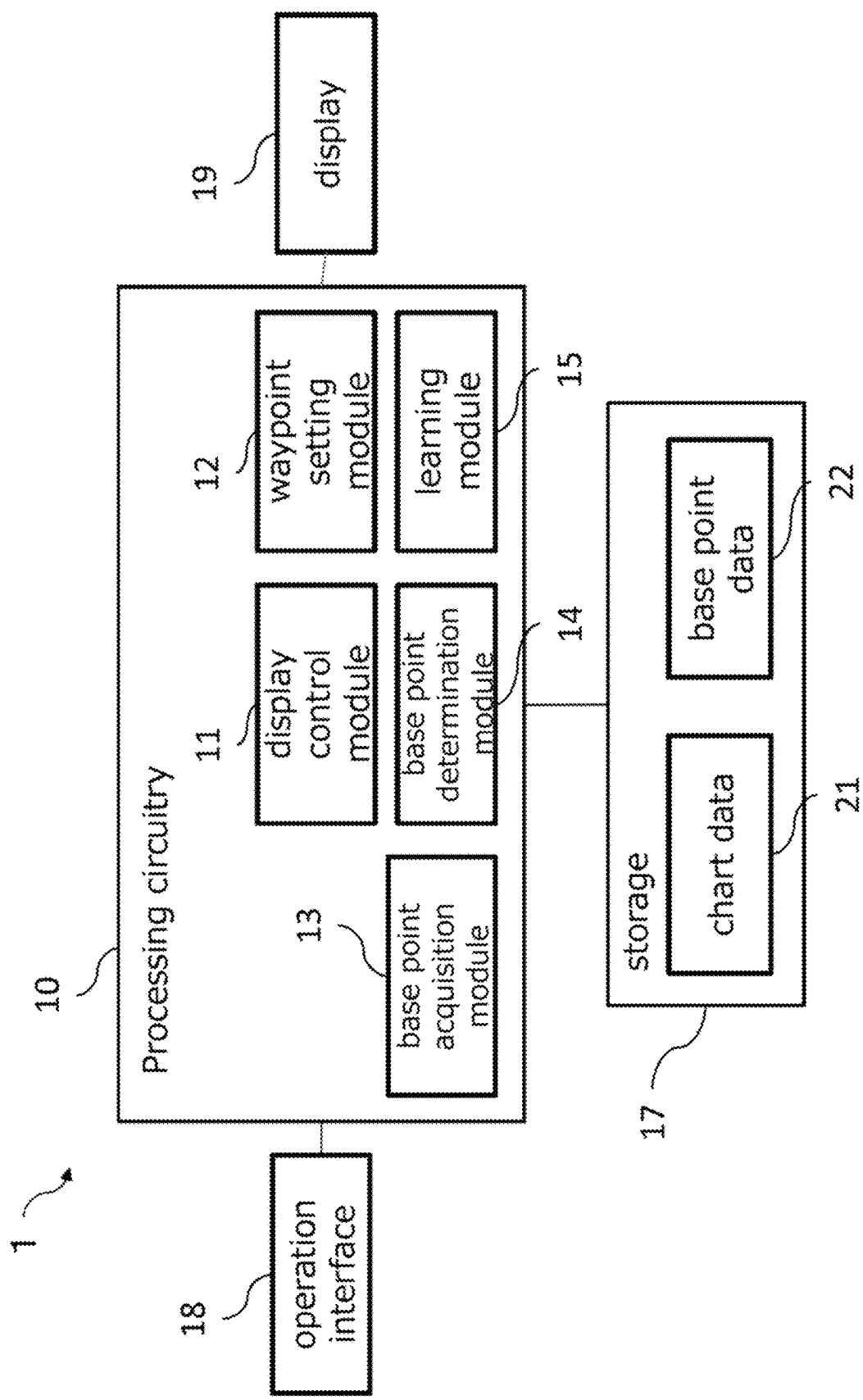
FIG. 2 is a diagram showing a configuration example of a route planning apparatus, in accordance with an embodiment of the present disclosure.

FIG. 2 is a block diagram of an example configuration of the route planning apparatus 1, in accordance with an embodiment of the present disclosure. As shown in FIG. 2, the route planning apparatus 1 includes a processing circuitry 10, a storage 17, an operation interface 18, and a display 19.

The processing circuitry 10 is a computing device that includes a CPU, a RAM, a ROM, an input/output interface, and the like. The processing circuitry 10 is associated with the storage 17. The storage 17 is an auxiliary storage device such as a nonvolatile memory. In an example, the CPU of the processing circuitry 10 is configured to execute information processing according to a program loaded from the storage 17 into the RAM.

In accordance with an embodiment, the program may be provided via an information storage medium such as, for example, an optical disk or a memory card, or may be provided via a communication network such as, for example, the Internet or a LAN.

In addition to the program, the storage 17 is configured to store chart data 21, a base point potential database (base point potential DB) 22, and the like. The base point DB (Data Base) 22 may be constructed externally and accessed via a communication network such as the Internet.

The processing circuitry 10 is associated with the operation interface 18 and the display 19. The operation interface 18 is a pointing device for designating a position in the screen of the display 19. The operation interface 18 includes but may not be limited to a trackball or a touch sensor. The display module 19 is a display device. The display 19 includes but may not be limited to a liquid crystal display or an organic electroluminescent display (EL) display.

The processing circuitry 10 includes a display control module 11, a point setting module 12, a base point acquisition module 13, a base point determination module 14, and a learning module 15. The CPU of the processing circuitry 10 is configured to execute control processing of each component of the processing circuitry 10 according to a predetermined program.

In an example, the display control module 11, the point setting module 12, the base point acquisition module 13, the base point determination module 14, and the learning module 15 may include suitable logic, circuitry, and interfaces that may be configured to perform operations associated with the processing circuitry 10 for displaying the chart on the screen and performing further operations on it. In another example, the processing circuitry 10 may perform the operations described below using one or more processors independently.

The display control module 11 may be configured to display a list of base points arranged in accordance with a predetermined priority on the screen of the display 19. The operation of each component of the processing circuitry 10 is described in detail later.

FIG. 3 is a diagram showing an example of contents of a potential base point database (DB) 22. The potential base point DB 22 stores one or more potential base points that may be a base point of a waypoint in association with its position. The potential base point DB 22 includes fields such as "ID" 31, "type" 32, "position" 33, "height" 34, and "visible distance" 35.

The "ID" field 31 is an identifier to identify base points. The "type" field 32 indicates type of the base points. The types of base points include, for example, targets such as lighthouses, buoys, capes and the like. The "position" field 33 indicates the position of the base point. The position of the base point is shown by position coordinates of latitude and longitude.

The "height" field 34 indicates the height of the base point. The "visible distance" field 35 represents distance of the light of the lighthouse when the potential base point is the lighthouse.

Figure 4:
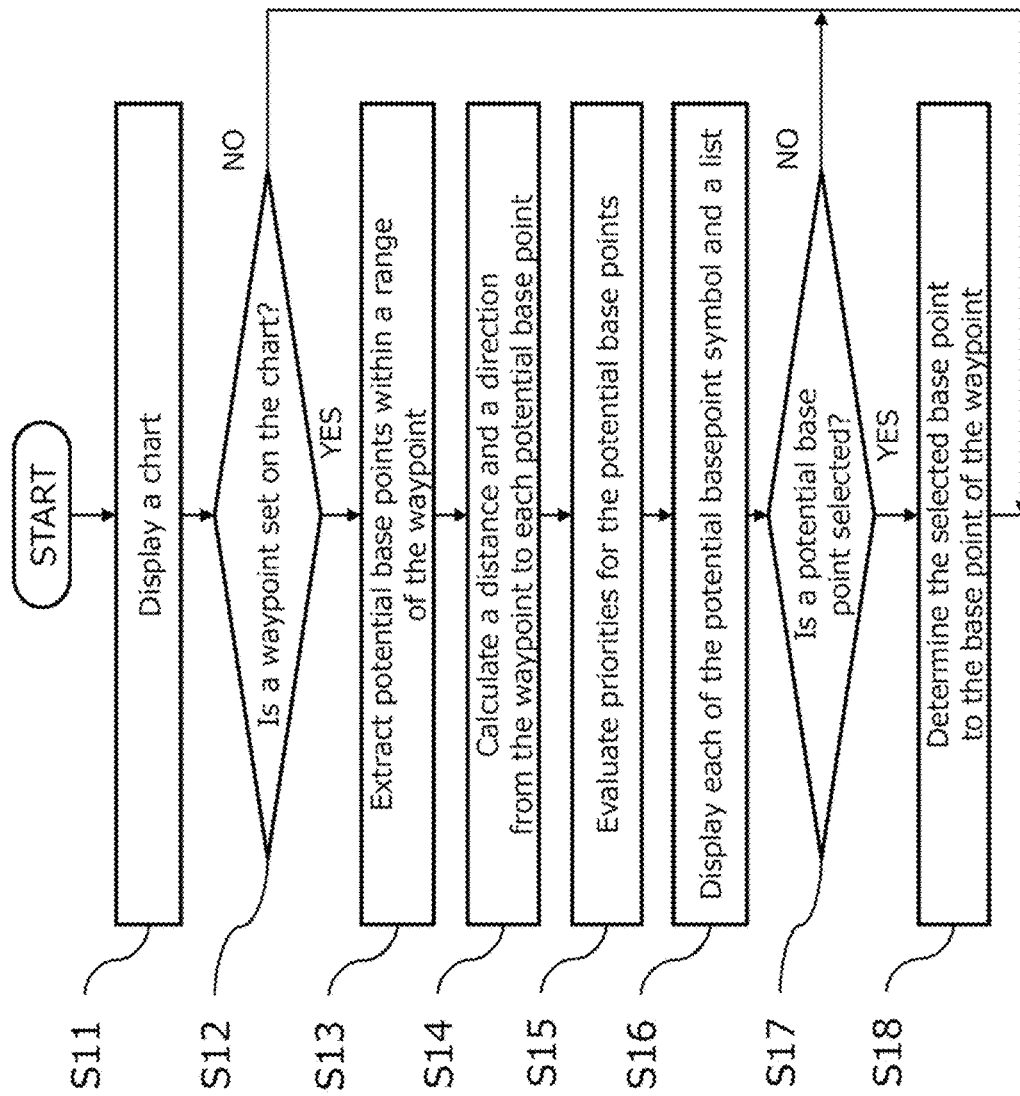
FIG. 4 is a diagram showing an example process of the route planning method, in accordance with an embodiment of the present disclosure.
Figure 5:
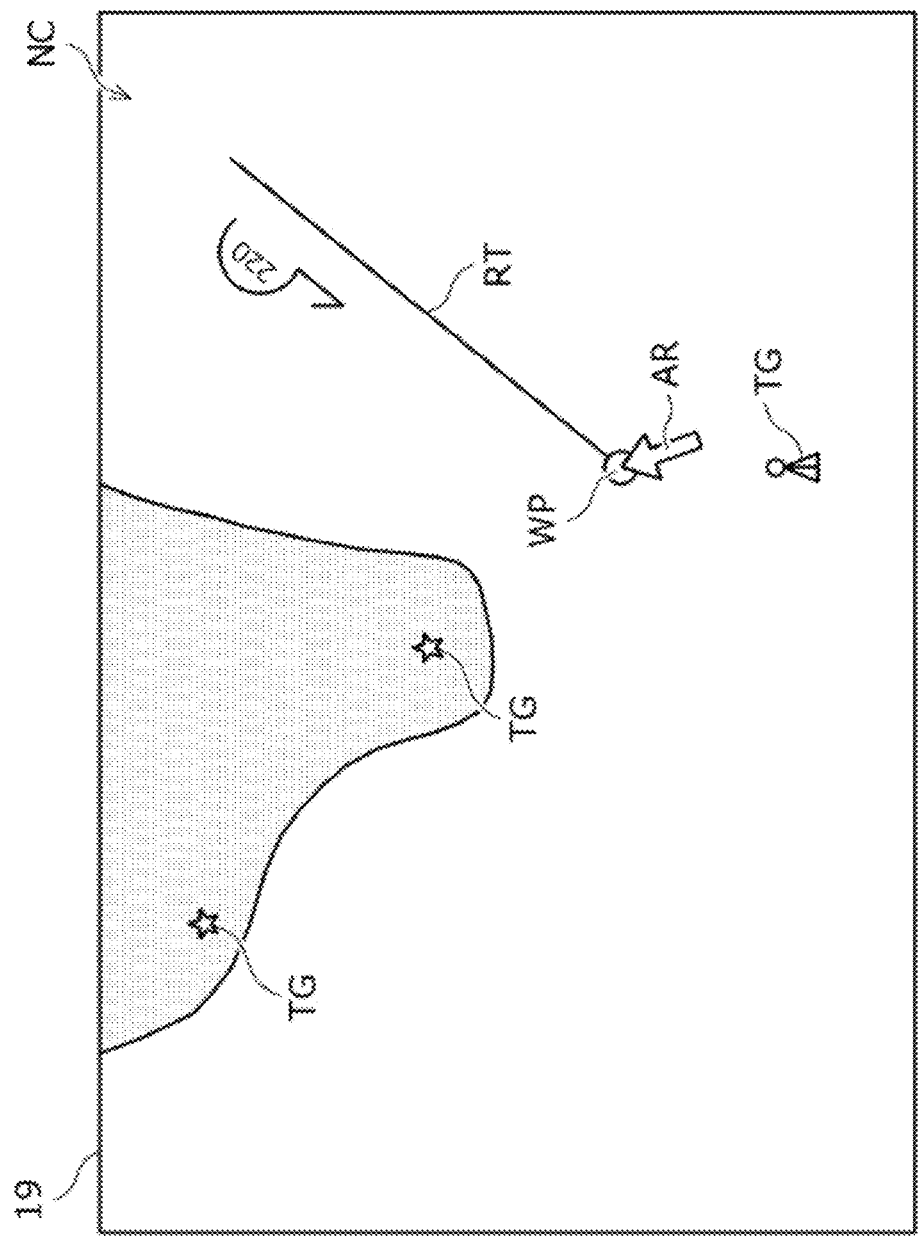
FIG. 5 is a diagram showing an example of a screen display, in accordance with an embodiment of the present disclosure.
Figure 6:
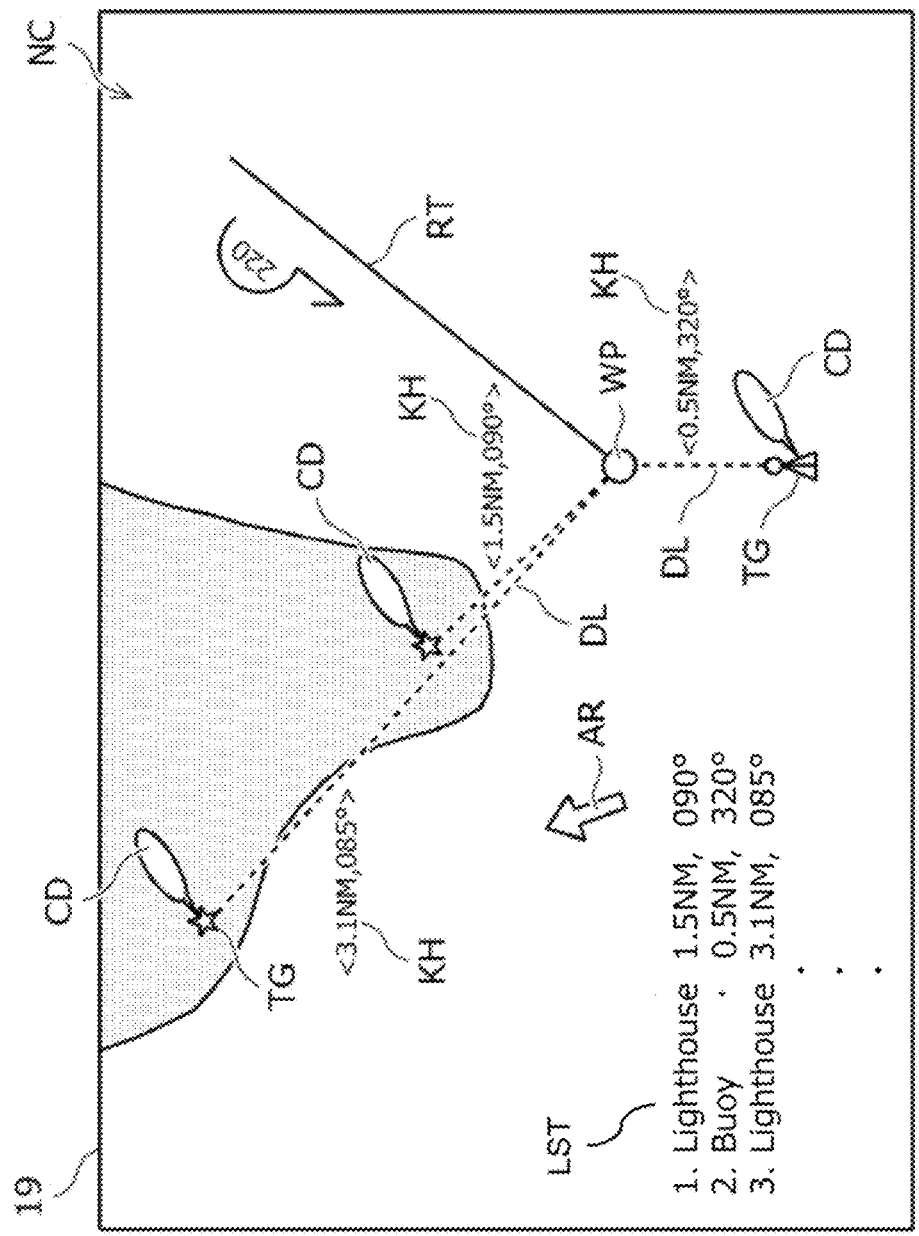
FIG. 6 shows an example of a screen display, in accordance with an embodiment of the present disclosure.

FIG. 4 is a flowchart showing an example process of the route planning method, in accordance with an embodiment implemented in the route planning apparatus 1 of FIG. 1. The processing circuitry 10 of the route planning apparatus 1 is configured to execute information process shown in the FIG. 4, according to a program. FIG. 5 and FIG. 6 are views showing an example of screen display, in accordance with an embodiment of the present disclosure.

At step of S11, the processing circuitry 10 is configured to display a chart NC on the screen of the display 19 based on the chart data 21 stored in the storage 17 using the display control module 11. (S11; processing as the display control module 11).

Next, at step of S12, the processing circuitry 10 is configured to set a waypoint WP on the chart NC according to the navigator's operation received by the operation interface 18 using the pint setting module 12. (S12; processing as the point setting module 12).

As shown in FIG. 5, a pointer AR interlocked with the operation interface 18 is displayed on the screen of the display 19, and the waypoint WP is set at a designated position on the chart NC. A route RT following the waypoint WP is also displayed on the screen of the display 19. Further, one or more targets TG such as lighthouses, buoys and capes are also displayed in the chart NC.

Returning to FIG. 4, at step S12 if it is determined that the waypoint WP is set on the chart NC (S 12; YES) the method proceeds to step S13. At step S13, the processing circuitry 10 is configured to extract a base point within a predetermined range, with the waypoint WP as a reference from the potential base point DB 22. (S 13; processing as the base point acquisition module 13).

Specifically, the processing circuitry 10 is configured to refer to the positions of the base points stored in the potential base point DB 22 and determines whether each base point is located within the range of the waypoint WP or not, and extracts the potential base point located within the range.

For example, a base point located in a circular range of a predetermined radius centered on the waypoint WP is extracted. It is not limited to this aspect, and for example, an elliptical shape range may be longer in left and right directions (port side to starboard side) than in fore and aft directions (bow to stern) of the ship.

Next, at step S14, the processing circuitry 10 is configured to calculate the distance and direction from the waypoint WP for each of the extracted potential base points. The direction of the potential base point from the waypoint WP is described as an angle with respect to the bow direction of the ship. For example, the direction may be 90 degrees to starboard and 270 degrees to port.

At step S15, the processing circuitry 10 is configured to calculate a predetermined priority for each of the extracted base points. The predetermined priority is based on at least one of the distance and the direction of each of the extracted base points from the waypoint WP.

Specifically, the predetermined priority may be higher as the distance from the waypoint WP to a corresponding potential base point is closer to the reference distance. The predetermined priority may be higher as the direction from the waypoint WP toward the base point is closer to 90 degrees to the bow direction.

For example, the predetermined priority is shown by the following function f which uses as variables the distance d from the waypoint WP to the potential base point, the direction (angle with respect to the bow direction) θ of the potential base point from the waypoint WP, the score p set for each type of potential base point, the height h of the potential base point, and the distance dl of the light when the potential base point is a lighthouse. The function f is defined as:

$$f(d, \theta, p, dl, \ldots) = \alpha d + \beta \theta + \gamma p + \delta h + \varepsilon dl + \ldots$$

The larger or smaller is the value of the function f, the higher is the predetermined priority. Here, α, β, γ, δ, and ε are weighting coefficients of each variable.

The variable "d" may be a difference from or the inverse of a predetermined reference value $d_0$. The variable "θ" may be a difference from a predetermined reference angle $n_0$ (for example, 90 degrees) or its inverse.

The direction (angle with respect to the bow direction) of the potential base point from the waypoint WP is an angle formed by an extension line of a straight line (previous path RT) from the previous waypoint to the waypoint WP, and a straight line connecting the waypoint WP and the potential base point.

Next, at step S16, the processing circuitry 10 is configured to display the extracted symbol and list of the potential base points on the screen of the display 19 using the display control module 11. (S16; Processing as a display control module).

As shown in FIG. 6, a symbol CD representing potential base points are added to the target TG of the potential base point and displayed on the screen of the display 19. A line DL connecting the waypoint WP and the target TG of the potential base point is displayed between the waypoint WP and the target TG, and a character string KH indicating a distance and a direction is displayed beside the line DL.

In the example shown in the FIG. 6, the symbol CD is added to the lighthouse at a distance of 1.5 NM (nautical mile) and a direction of 90 degrees transverse) with respect to the waypoint WP. In addition, the symbol CD is added to the buoy at the distance of 0.5 NM and the direction of 320 degrees. Further, the symbol CD is added to the lighthouse at the distance of 3.1 NM and the direction of 85 degrees.

Further, a list LST of the potential base points is displayed on the screen of the display 19. In the list LST, the potential base points are arranged in the order of the higher predetermined priority.

In the example shown in the FIG. 6, the items of the lighthouse at the distance of 1.5 NM in the direction of 90 degrees with respect to the waypoint WP, the buoy at the distance of 0.5 NM in the direction of 320 degrees, and the lighthouse at the distance of 3.1 NM in the direction of 85 degrees are included in the list LST in this order.

At step S17, the processing circuitry 10 is configured to check if the potential base point is selected or not. If the potential base point is not selected, the method is stopped. If the potential base point is selected, the method proceeds to step S18.

Referring back to FIG. 4, next, at step of S18, the processing circuitry 10 is configured to determine the base point selected by the navigator's operation received by the operation interface 18 among the potential base points displayed on the screen of the display 19 (Sections S17 and S18; Processing as the base point determination circuitry 14) to the base point of the waypoint WP.

As shown in FIG. 6, the selection of the base point is determined by designating the item of the base point included in the symbol CD or the list LST indicating the potential base point by the pointer AR.

In order to avoid the screen display clutter, only the symbol CD corresponding to the item of the potential base point selected in the list LST may be identified and displayed as the other symbol CD, and the line DL and the character string KH may be added.

According to the embodiment described above, when a waypoint is set, a base point near the waypoint is presented to the navigator and the navigator selects the base point accordingly. In the list presented to the navigator, the base points are arranged according to the predetermined priority. Since, the user is required to confirm from the potential base point having the higher predetermined priority, the route planning apparatus 1 enables to determine the base point of the waypoint.

The highest predetermined priority among the extracted potential base points may be automatically determined as the base points. However, the selection of waypoints and the base points is based on the experience of the navigator. Further, the potential base point is presented to the navigator and the navigator's selection is accepted.

In some embodiments, the processing circuitry 10 is configured to adjust the predetermined priority based on the selection result by the navigator (or user) (processing as the learning module 15). In other words, when the base points of second or later priority are selected, the weighting coefficient of the function for calculating the predetermined priority may be further optimized. The adjustment of the predetermined priority may be realized, for example, by performing supervised learning using the learning module 15 (shown in FIG. 2), in which the selected potential base points are set as the correct answer.

Although the embodiments of the present disclosure have been described above, the present disclosure is not limited to the embodiments described above. Needless to say, it is possible for those skilled in the art to make various modifications.

DESCRIPTION OF CODES (1) Route planning apparatus,
(2) Radar,
(3) GNSS receiver,
(4) Gyrocompass,
(5) AIS,
(10) Processing circuitry,
(11) Display control module,
(12) Point setting module,
(13) Base point acquisition module,
(14) Base point determination module,
(15) Learning module,
(17) Storage,
(18) Operation interface,
(19) Display, and
(100) Ship ICT system

What is claimed is:

1. A route planning apparatus for planning a navigation route of a ship, comprising:
a display;
an operation interface configured to receive one or more user inputs;
a storage configured to store plural base points to be used for navigation; and
processing circuitry configured to:
set a waypoint on a chart displayed on the display in response to a first input that is received by the operation interface;
extract potential base points from the stored plural base points that an within a predetermined range of the set waypoint;
display the extracted potential base points on a screen of the display; and
in response to a second input that is received by the operation interface, select one base point from among the potential base points to be a base point for navigating with resect to the set waypoint.

2. The route planning apparatus of claim 1, wherein the processing circuitry is configured to display on the screen a list of the extracted potential base points arranged in accordance with a predetermined priority.

3. The route planning apparatus of claim 2, wherein the predetermined priority is based on at least one of:
a distance between the corresponding base point and the waypoint, or
a direction of the corresponding base point from the waypoint.

4. The route planning apparatus of claim 2, wherein the higher the distance from the waypoint is closer to a reference distance, the higher the predetermined priority.

5. The route planning apparatus of claim 2, wherein the predetermined priority increases as a direction from the waypoint is closer to 90 degrees with respect to a bow direction of the ship.

6. The route planning apparatus of claim 2, wherein the processing circuitry is further configured to:
adjust the predetermined priority based on a selection result by a user.

7. A route planning method performed by a route planning apparatus for planning a navigation route of a ship, the route planning apparatus including a storage that stores plural base points to be used for navigation, the route planning method comprising:
displaying a chart on a screen of the route planning apparatus;
setting a waypoint on the chart displayed on the display in response to a first input received by the operation interface;
extracting potential base points from the stored plural base points that are within a predetermined range of the set waypoint;
displaying the extracted potential base points on the screen; and
in response to a second input received by the operation interface, selecting one base point from among the potential base points to be a base point for navigating with respect to the set waypoint.

8. A non-transitory computer product containing instructions, when executed by one or more processors, cause a processing circuitry of a route planning apparatus to perform a method that comprises:
displaying a chart on a screen;
setting a waypoint on the chart displayed on the display in response to a first input received by an operation interface of the route planning apparatus;
extracting, from plural base points stored in a memory of the route planning apparatus, potential base points that are within a predetermined range of the set waypoint;
displaying the extracted potential base points on the screen; and
in response to a second input received by the operation interface, selecting one base point from among the potential base points to be a base point for navigating with respect to the set waypoint.

* * * * *